(12) United States Patent
Plunkett et al.

(10) Patent No.: US 7,376,569 B2
(45) Date of Patent: May 20, 2008

(54) APPARATUS AND METHOD FOR PROVIDING COMPENSATION INFORMATION

(75) Inventors: Gregory Kent Plunkett, Boston, MA (US); Andrew Linn, Waltham, MA (US); Carolyn Kirsch Rumpel, Boston, MA (US); William H. Coleman, Boston, MA (US)

(73) Assignee: Salary.com, Waltham, MA (US)

( * ) Notice: Subject to any disclaimer, the term of this patent is extended or adjusted under 35 U.S.C. 154(b) by 540 days.

(21) Appl. No.: 09/823,524

(22) Filed: Mar. 30, 2001

(65) Prior Publication Data

US 2002/0143752 A1 Oct. 3, 2002

(51) Int. Cl.
G06Q 10/00 (2006.01)
(52) U.S. Cl. .......................................................... 705/1
(58) Field of Classification Search .................... 705/1, 705/500
See application file for complete search history.

(56) References Cited

U.S. PATENT DOCUMENTS 6,735,571 B2 * 5/2004 Coleman et al. ............... 705/7
6,862,596 B2 * 3/2005 Thomsen ..................... 707/10

FOREIGN PATENT DOCUMENTS

EP 1096404 A2 * 5/2001

OTHER PUBLICATIONS www.erieri.com, retrieved from wayback machine on Jul. 15 and 26, 2004 any linkage Mar. 2, 2000.*
www.careerbuilder.com; anylinkage wayback machine Feb. 29, 2000. Retrieved on Jun. 20, 2005.*
www.erieri.com; anylinkage wayback machine, Mar. 2, 2000. Retrieved Jul. 15 and 24, 2004.*
www.careerbuilder.com; retrieved from archive.org; any linkage Feb. 29, 2000.*
Monster.com—Websites.
SalaryExpert.com—Websites.

* cited by examiner

*Primary Examiner*—John G Weiss
*Assistant Examiner*—Traci L Casler
(74) *Attorney, Agent, or Firm*—David F. Crosby; Mintz Levin Cohn Ferris Glovsky and Popeo PC

(57) ABSTRACT

An apparatus and method pertains to calculating and presenting compensating values for one or more professions. An apparatus generates a user interface that prompts a user for a job description entry and a geographic location entry. The apparatus has a database to store salaries, each salary associated with a job description and a geographic location. The apparatus retrieves from the database salaries whose job description and geographic location matches the job description entry and the geographic location entry. The apparatus compiles retrieved salaries to generate a median salary, which is transmitted to a user device.

24 Claims, 15 Drawing Sheets

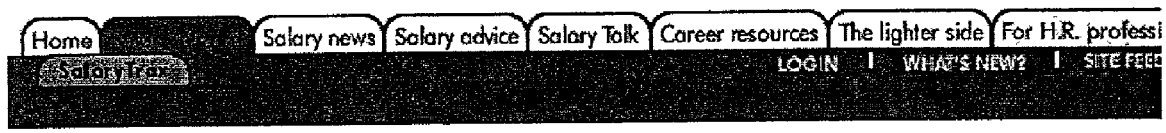
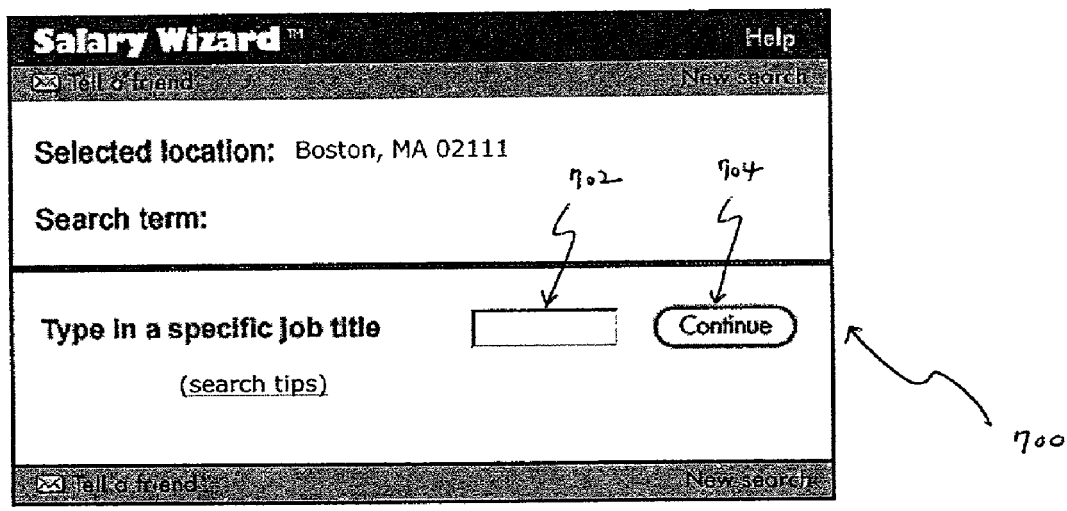
Fig. 7

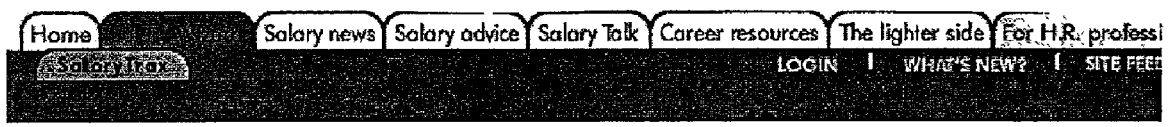

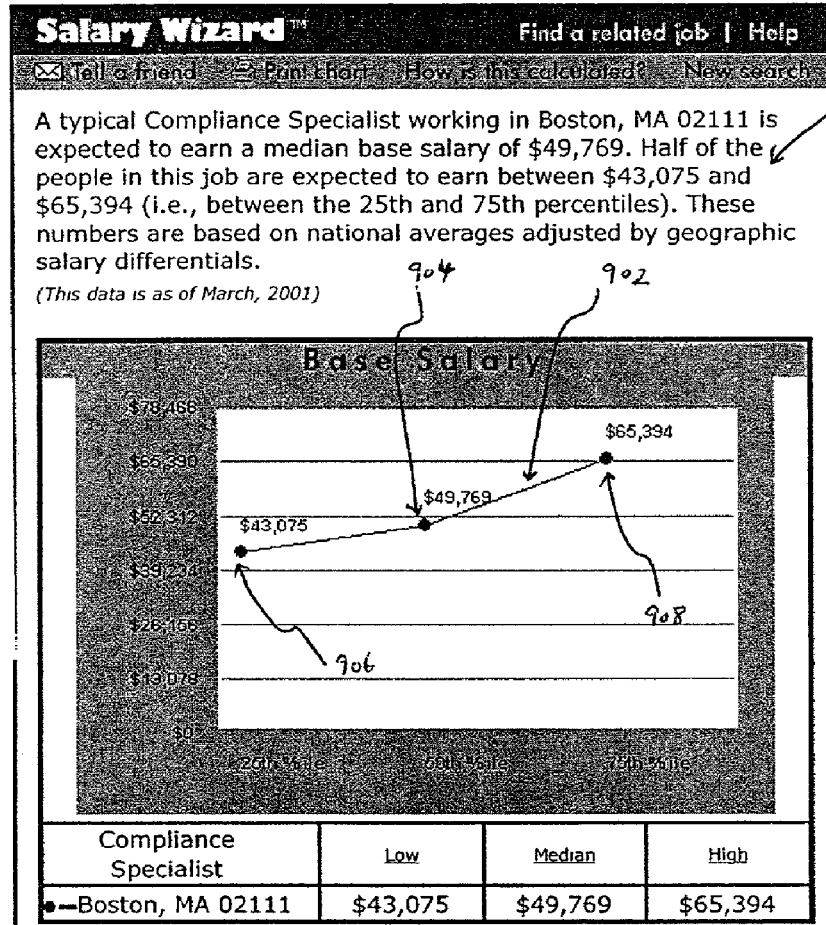

A typical Compliance Specialist working in Boston, MA 02111 is expected to earn a median base salary of $49,769. Half of the people in this job are expected to earn between $43,075 and $65,394 (i.e., between the 25th and 75th percentiles). These numbers are based on national averages adjusted by geographic salary differentials.

(This data is as of March, 2001)

| Compliance Specialist | Low | Median | High |
|---|---|---|---|
| —Boston, MA 02111 | $43,075 | $49,769 | $65,394 |

Find job openings for Compliance Specialist in your local area.

jobs.com     headhunter     monster.com

Compliance Specialist
Responsible for the coordination and completion of all government, regulatory, and compliance documents for all business units in an organization. Requires a bachelor's degree in a related area and 2-4 years of experience in the field or in a related area. Familiar with standard concepts, practices, and procedures within a particular field. Relies on limited experience and judgment to plan and accomplish goals. Performs a variety of

Base Salary does not include any cash bonuses or cash incentives
click here to view total cash compensation

---

Compare Compliance Specialist working in Boston, MA 02111 to...

1. The U.S. national average for Compliance Specialist  (Go)  — 1002

2. The same job in a different location  — 1003
   [choose location ▼]  (Go)  — 1004

3. A related job (Boston, MA 02111)  — 1005
   [choose related job ▼]  (Go)  — 1006

---

Related jobs: (create salary report for job title)

| | |
|---|---|
| Associate General Counsel | Attorney I |
| Attorney II | Attorney III |
| Chief Legal Counsel | Compliance Manager |
| Compliance Specialist | Compliance Specialist, Sr |
| Contracts Administrator | Court Reporter |
| Custom Officer | Director Safety |
| Environmental Compliance Specialist | Environmental Compliance Specialist, Sr |
| General Counsel | Judge/Magistrate |
| Legal Secretary | Managing Attorney |
| Paralegal | Regulatory Affairs Analyst |
| Regulatory Affairs Analyst, Sr | Safety Specialist |
| Shareholder Relations Administrator | Top Legal Executive |
| Workers Compensation Administrator | |

— 1000

Additional resources:

Survey Finder  *For HR and business managers*
Related salary surveys -- salary info from other survey sites
Government data -- U.S. Census Bureau and BLS data
Trade publications -- related trade publications
Trade associations -- related trade associations

Fig. 10

APPARATUS AND METHOD FOR PROVIDING COMPENSATION INFORMATION

BACKGROUND OF THE INVENTION

1. Field of the Invention

The present invention pertains to calculating and presenting compensation information for one or more jobs.

2. Background of the Invention

Similar to a commodity that is dictated by supply and demand of the marketplace, a person's service is perceived along similar values. For example, is the person's skill is in high demand such that it is difficult to recruit people with such skills? What is a reasonable compensation level for a person with a particular skill at a particular region? Does the person's current salary make the person susceptible to being scouted by another company?

A salary that a person receives for their services rendered is extremely important to that person because it directly affects the person's livelihood. If the person believes that their services rendered are more valuable than what is being compensated, there is likelihood that the person will seek a job elsewhere. However, salary information is not readily available making it difficult for a current or potential employer or employee to determine what is a reasonable level of compensation.

Previously, an employee or potential job seeker could receive salary information from job advertisements or from articles contained in a newspaper or magazine. However, salaries obtained from job advertisements are usually a perceived value of a potential employer based on their own circumstances and not necessarily what the market perceives as a reasonable salary. Concerning salary data contained in newspapers and magazines, they may be outdated as of the time of publication or may not be collected nor analyzed methodically. Thus, they do not reflect a true compensation level. Furthermore, this information may not be particular to the employee or job seeker's situation, thus may not be useful information.

From an employer's point of view, not knowing compensation levels of various positions in the company may be problematic. If the employees perceive that they are being underpaid, the employees may leave before the company can react to the compensation demands. Furthermore, without knowing a value placed on a skill in the marketplace, it is difficult for a employer to form a compensation package to entice people with those skills. Some employers have avoided making this decision by placing the onus on the potential employee to inform them as to what a reasonable salary should be. Others have relied on consulting firms to provide them with market salary information on various positions within the company. However, consulting fees are extremely expensive and the employer may not be able to obtain that information on a need basis. Further, such information is not available to an average person seeking a job.

SUMMARY OF THE INVENTION

According to one aspect of the invention, a system for providing compensation calculation comprises a processing unit configured to generate a user interface to prompt a user for a first job description entry and a first geographic location entry, a network interface to transmit the user interface to a user device and to receive a first job description entry and a first geographic location entry from the user device, a database to store a plurality of salaries, each salary associated with a job description and a geographic location, and wherein the processing unit is further configured to retrieve from the database, a first set of salaries having a job description and geographic location that matches the first job description entry and the first geographic location entry, generate a first median salary using the first set of salaries, and transmit through the network interface the first median salary associated with the first job description and the first geographic location to the user device.

In another aspect of the invention, a method of providing compensation calculation comprises receiving a first job description entry, receiving a first geographic location entry, retrieving a first set of salaries using the first job description and the first geographic location, using the first set of salaries to generate a first median salary, and displaying the first median salary associated with the first job description and the first geographic location.

BRIEF DESCRIPTION OF THE DRAWINGS

For better understanding of the invention, reference is made to the drawings which are incorporated herein by reference and in which:

FIG. 7 illustrates an advanced job title page to perform job title search in accordance with an embodiment of the invention;

FIG. 9 illustrates a salary report page showing salaries in graphical representation in accordance with an embodiment of the invention;

FIG. 9a illustrates an alternative salary report page with links to job openings at various entities in accordance with an embodiment of the invention;

FIG. 10 illustrates a salary comparison page to perform salary comparison in accordance with an embodiment of the invention;

DETAILED DESCRIPTION

Embodiments of the present invention provide simplified systems and methods for calculating and presenting compensation values for one or more professions. In one embodiment that will now be described, a compensation calculation system is implemented over a wide area computer network, such as the Internet, however, as understood by those skilled in the art, embodiments of the present invention are not limited for use with the Internet or with other computer networks. In describing embodiments of the present invention, the terms "compensation" and "salary" are interchangably used. In describing embodiments of the present invention, the terms "zip code" and "state/metro area" are intended to cover both geographic coding systems used in the United States and foreign countries.

Figure 1:
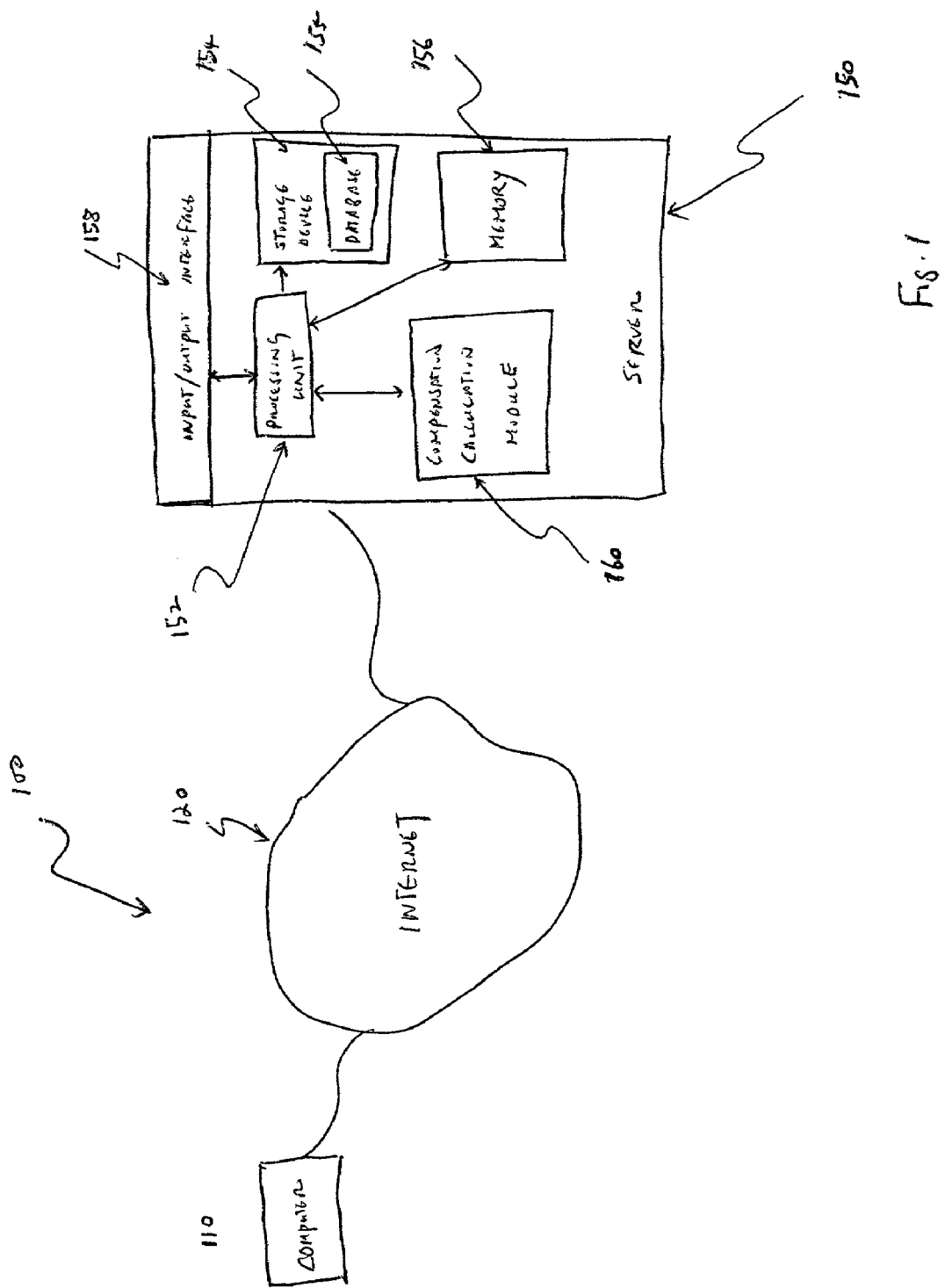
FIG. 1 illustrates a system for calculating compensation in accordance with one embodiment of the invention.

FIG. 1 illustrates a first embodiment of the present invention of a system 100 for calculating compensation. The system 100 includes a user computer 110 and a server computer 150 coupled to the user computer over the Internet 120. Computer 110 may be implemented using one of a number of available computers that are equipped to access the Internet, such as an International Business Machine (IBM) compatible Personal Computer (PC) or a computer manufactured by Apple Computer Inc. and the like. As is well known in the art, the computer 110 may include a central processing unit (CPU), a read only memory (ROM) usually containing a Basic Input Output System (BIOS), a main memory usually represented by random access memories (RAMs) and various controllers, all connected together through a system bus. The computer may also have various peripheral devices such as a keyboard, a mouse, disk drives such as a fixed disk drive, a floppy drive and a compact disc (CD) ROM drive, a video monitor, a printer, a modem and the like connected to pertinent controllers that allow the computer 110 to communicate with the user or the outside world. In other embodiments of the present invention, the computer 110 may be replaced by one of a number of Internet access devices known in the art, including Internet appliances and wireless devices such as PDAs and mobile phones.

The server 150 includes a compensation calculation module 160. The compensation calculation module 160 may be implemented as computer instructions contained in a computer readable medium such as a fixed disk drive, a non-volatile memory semiconductor memory such as read only memory (ROM) or flash memory, a volatile memory such as RAMs or coded signals transitioning through a wire medium or a wireless medium. In one embodiment, the server hardware is implemented using a commercially available server, such as those available from Sun Microsystems Inc., Compaq Computer Corporation and others. The server comprises a processing unit 152, a storage device 154 such as a fixed disk drive and a main memory 156 that are in communication with each other. The server 150 further comprises an input/output interface 158 that couples the server to the Internet 120. The server 150 includes database 155 (located in the storage drive 154) that is adapted to store various information concerning compensation by job title and geographic location. According to one embodiment, the compensation information of the various jobs are gathered periodically on a local, national and international basis and categorized by job title and geographic location. The categorized compensation information is entered into the database 155 using a terminal connected to the server 150.

Figure 3:
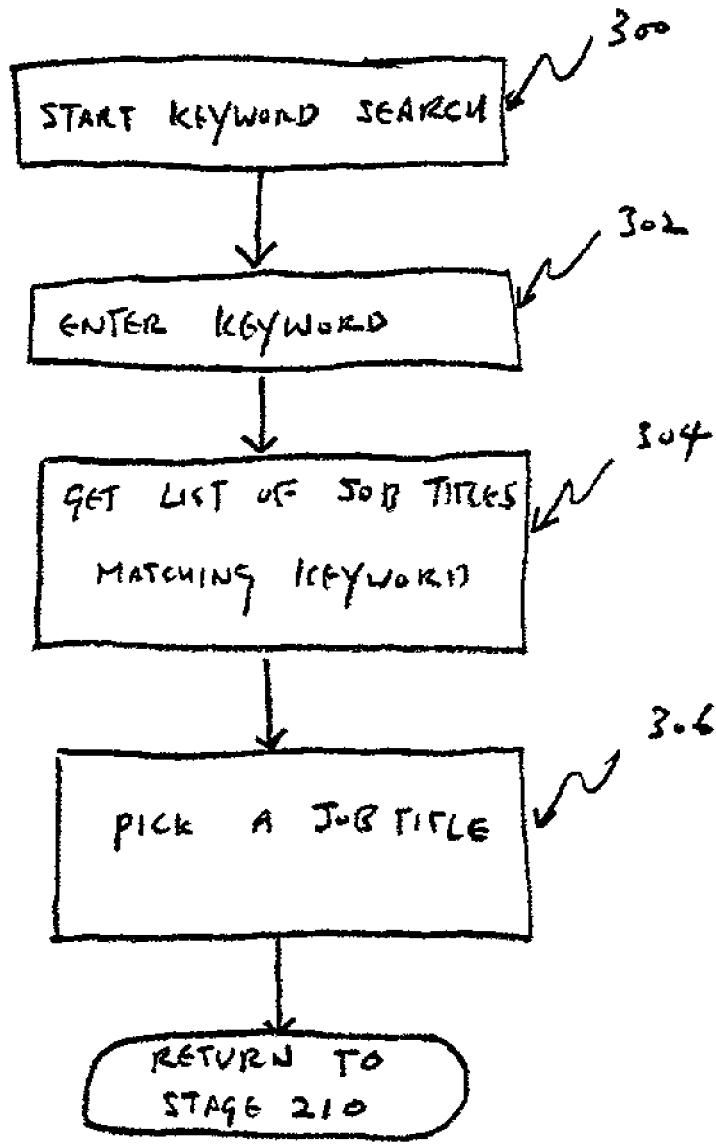
FIG. 3 is a flow diagram that shows a advanced job title search in accordance with an embodiment of the invention.
Figure 4:
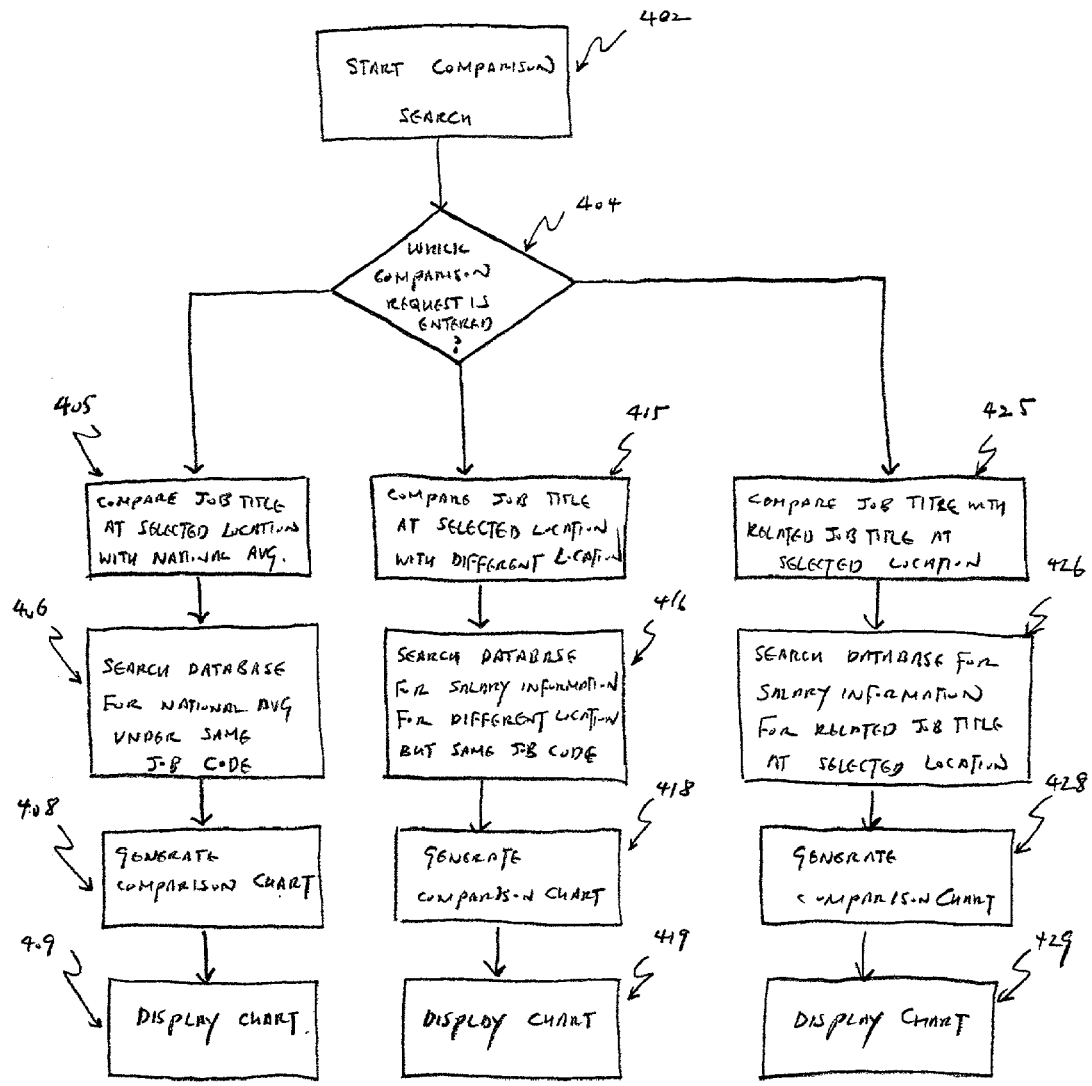
FIG. 4 is a flow diagram that shows the features of salary comparison in accordance with an embodiment of the invention.

A method 200 of operating the server 150 with compensation calculation module 160 in accordance with an embodiment of the invention will now be described with reference to FIGS. 2-14. In particular, FIGS. 2-4 are flow diagrams illustrating the method 200 and FIGS. 5-14 illustrate graphical user interfaces (GUIs) produced by the server 150 and displayed, for example, on the video monitor of computer 110.

Figure 2:
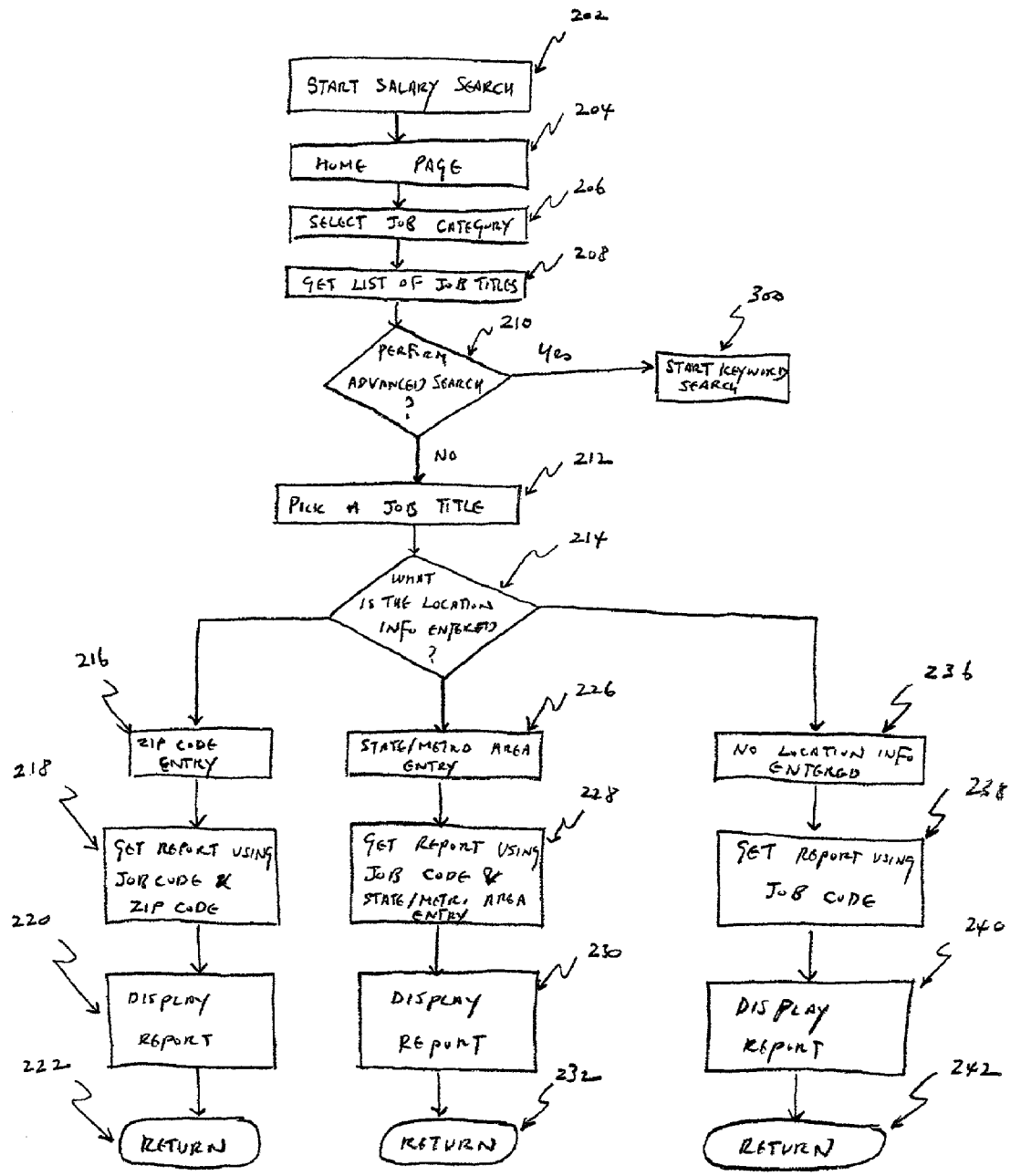
FIG. 2 is a flow diagram that shows a method of operating a server with compensation calculation module in accordance with an embodiment of the invention.
Figure 5:
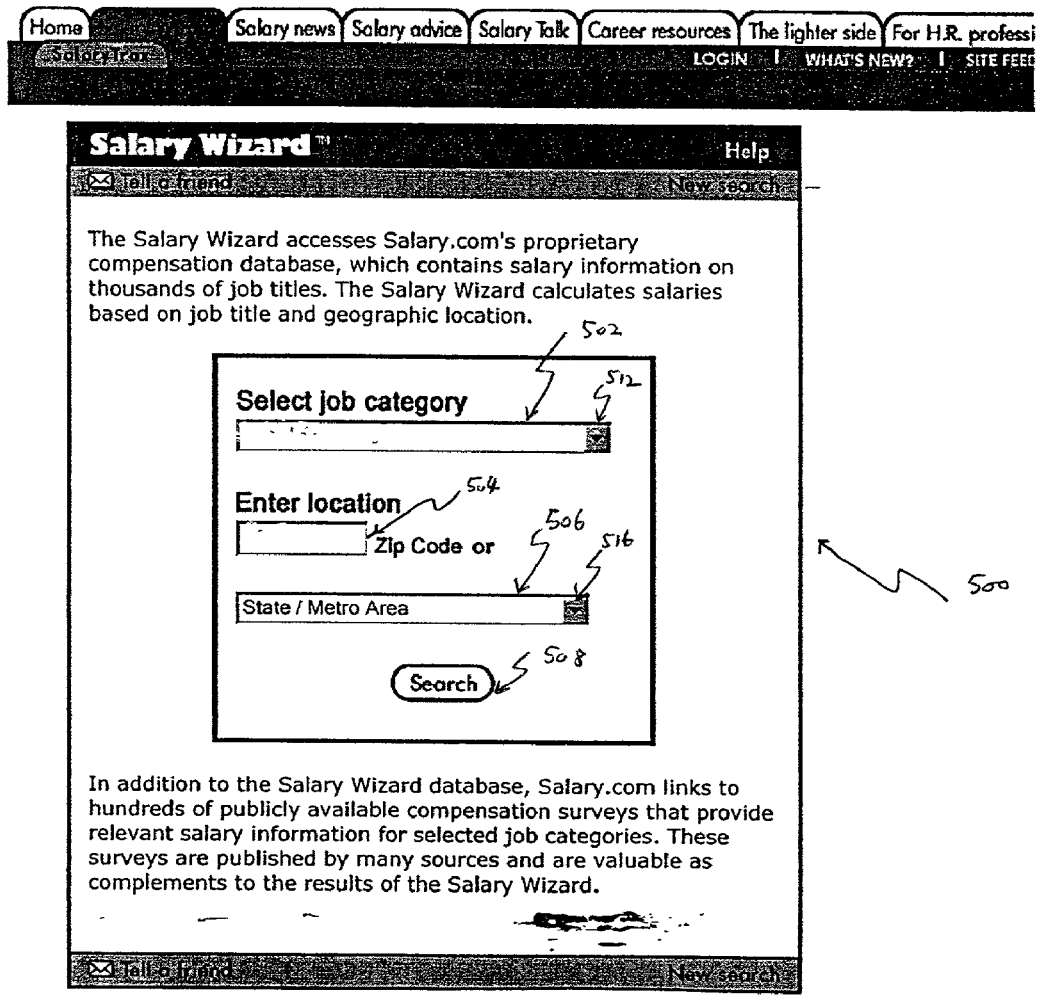
FIG. 5 illustrates a home page to enter job category and geographic information in accordance with an embodiment of the invention.

With reference to FIG. 2, at stage 202 of the method 200, a user of system 100 enters a specified Uniform Resonance Locator (URL) that connects the user to the Website of the server 150 containing the compensation calculation module 160. Upon access to the server 150, the user is greeted with a home page (stage 204) that allows the user to perform a compensation search at the server 150. A home page 500 that is used in one embodiment is shown in FIG. 5. Home Page 500 comprises three entries which are "Select Job Category" entry 502, "Enter Location" entry 504 and "State/Metro Area" entry 506. The Select Job Category entry 502 is a "drop-down" menu that is activated by clicking a scroll icon 512 that is located at the right side of the Select Job Category entry 502. The drop-down menu displays a list of job categories from which the user selects a job category that interests the user (stage 206). The user may enter a zip code in the Location entry 502 that indicates a zip code locale of the job title in which the user is interested in or alternatively, the user may click a scroll icon 516 that is located at the ride side of the State/Metro Area entry 506. This action causes another drop-down menu to appear with a list of state/metro areas that the user can select from. As a default option, in one embodiment of the invention, if the user does not enter location information, it is assumed that the user is interested in a national average salary information for the job title. After the user has selected a job category and a location, the user clicks a "Search" icon 508 that causes a job title page to be displayed that lists various job titles associated with the selected job category (stage 208).

Figure 6:
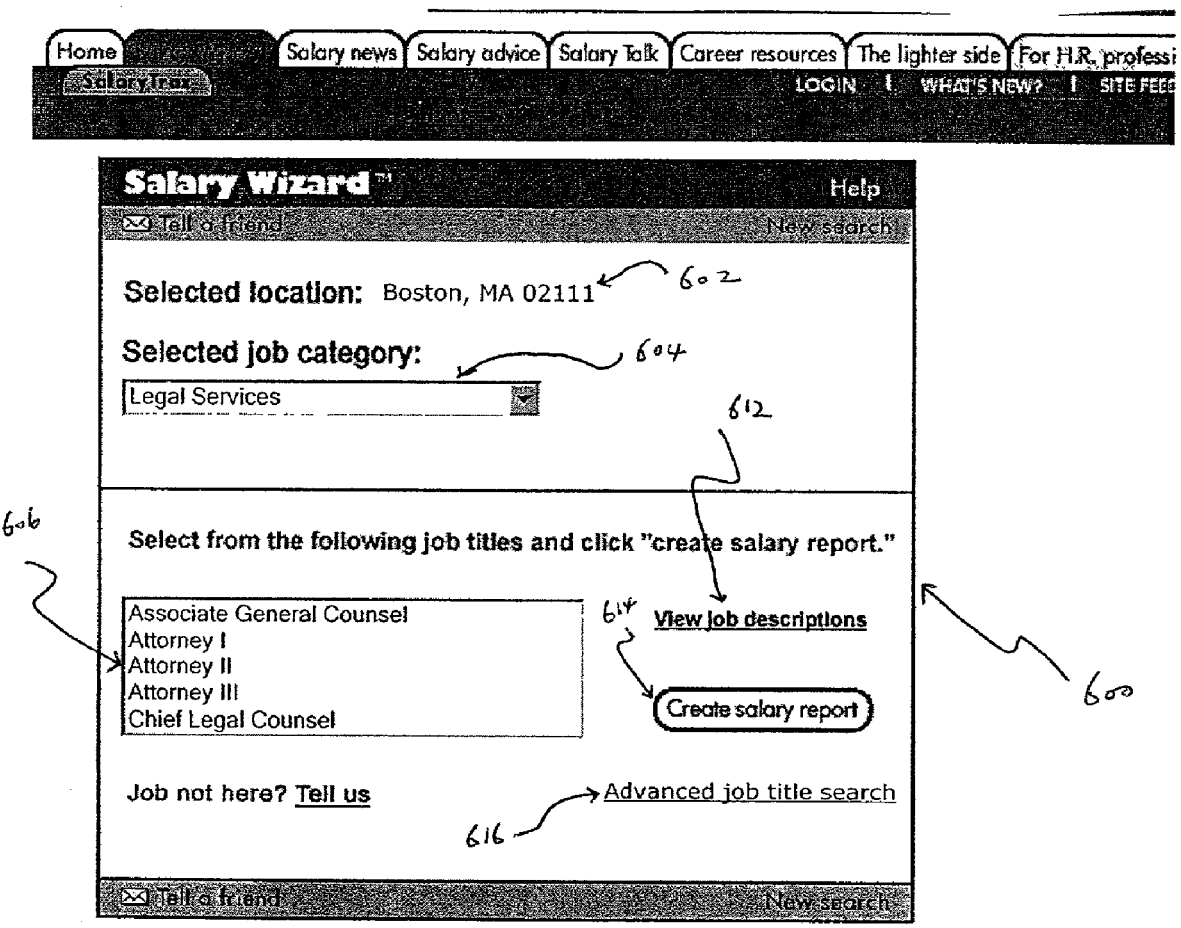
FIG. 6 illustrates a job title page that lists job titles in accordance with an embodiment of the invention.

A job title page 600 used in one embodiment is illustrated in FIG. 6. The job title page 600 displays the user's selected location 602 and job category 604 at the top portion of the job title page 600. Additionally, the job title page 600 displays a list of job titles 606 associated with the job category 604 that the user selected. The user selects a job title that describes the job for which the user desires to obtain salary information. A "View Job Descriptions" icon 612 is provided at the right side of the job title list 606 which the user may click to obtain detailed job descriptions corresponding to various job titles such as the level of education, years of experience, the type of jobs expected to be performed and so forth. Once the user has made a job title selection, the user clicks a "Create Salary Report" icon 614 that causes the compensation calculation module 160 in conjunction with the processing unit 152 to search the database 155 (see FIG. 1) to gather, compile and generate salary information pertaining to the job title at the location specified by the user.

Figure 8:
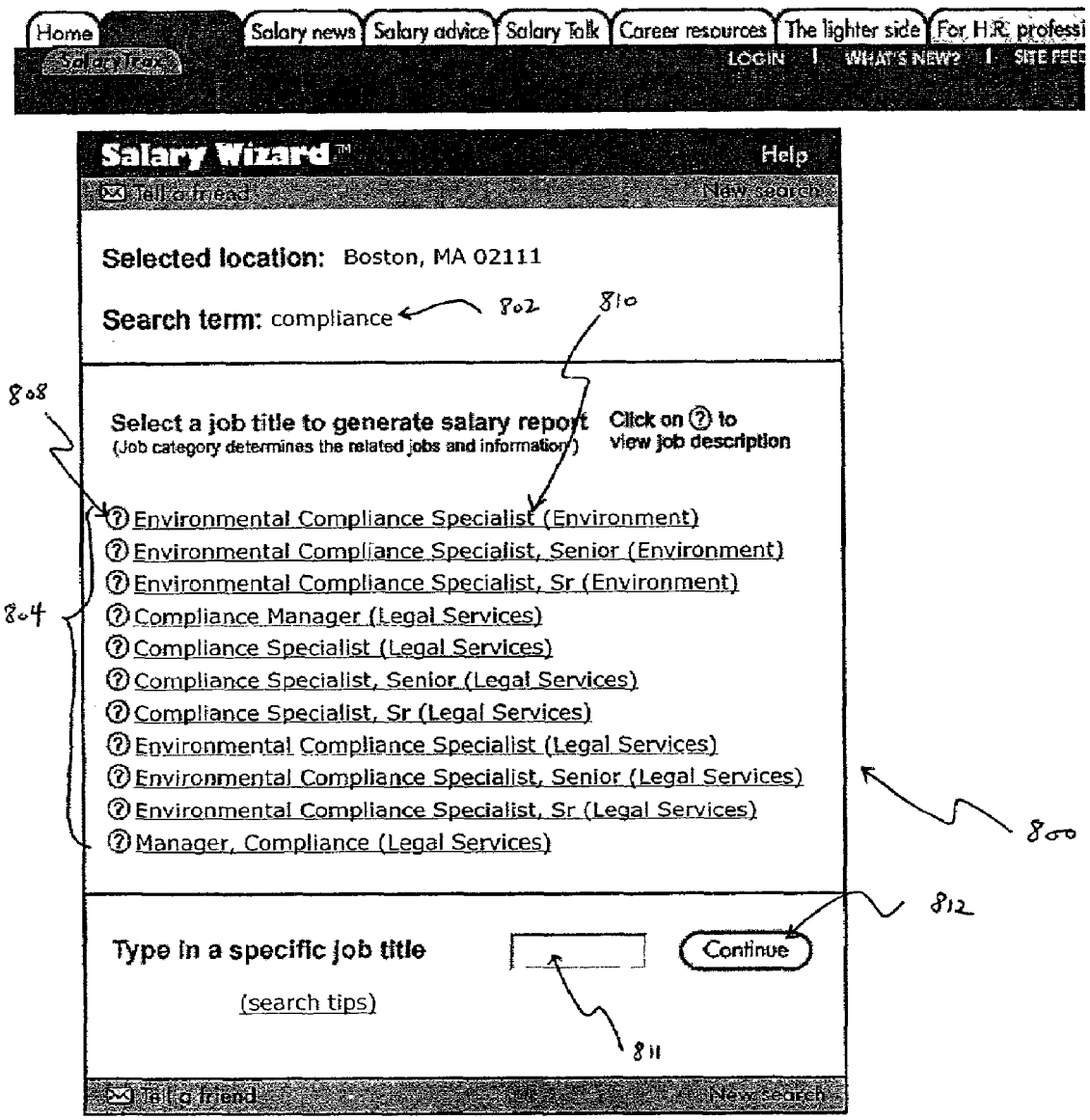
FIG. 8 illustrates a page with list of job titles found with a keyword in accordance with an embodiment of the invention.

For various reasons, at stage 210, the user may decide to perform a job title search using one or more keywords (stage 300). An "Advanced Job Title Search" icon 616 is provided on the job title page 600 that when clicked opens a job search page 700 that provides an entry 702 to enter a keyword or keywords as shown in FIG. 7. With reference to the flow diagram in FIG. 3, at stage 302, upon entry of the keyword or keywords in the keyword entry 702, the user clicks a "Continue" icon 704 to perform a search of the database 155 to obtain a list of job titles that match the entered keyword or keywords (stage 304). FIG. 8 illustrates an example of a page 800 with list of job titles 804 that were found in the database 155 corresponding to the keyword "compliance"

802. From the list of job titles 804, the user may choose a job title for which the user desires to obtain salary information (stage 306). In the embodiment illustrated in FIG. 8, the user is provided with additional features. If the user clicks a "Query" button 808 next to the displayed job title 810, a new page is opened where the user is given a brief description of the job title such as the level of education, years of experience, the type of jobs to be performed and so forth. If the user desires to perform a new search, the user can enter a new keyword or keywords in the keyword entry 811 and click a "Continue" button 812. Otherwise if the user finds the job title in which the user desires to obtain salary information, the user clicks the appropriate job title 810.

With reference to FIG. 2, after a job title has been selected, at stage 212, the server 150 receives the selected job title and determines what location entry has been inputted by the user from the home page 500 at stage 214 (see FIG. 5). At stages 216-222, if the user entered a zip code, the salaries are searched in the database 155 based on the job title corresponding to the zip code. The retrieved salaries are compiled in a form suitable for graphical representation, such as that shown in FIG. 9. In another embodiment, the server 300 compiles the national average of the salary information requested for a job title and applies a weight factor associated with the zip code (or state/metro area) to adjust the salary information to that geographic location.

At stages 226-232, if the user entered state/metro area information, the salaries are searched in the database 155 based on the job title corresponding to the state/metro area information. The retrieved salaries are compiled in a form suitable for graphical representation. At stages 236-242, if the user has not specified a zip code nor a state/metro area, a default location information is used which is a national average salary for the specified job title. The salaries are searched in the database 155 based on the job title but in any location and the retrieved salaries are compiled in a form suitable for graphical representation.

With reference to FIG. 9, a salary report page 900 displays the salary information compiled by the server 150 in a form of a line graph 902. However, the type of graph used is a matter of choice and other graphical representations may be used, such as a bar graph. The line graph 902 shows on its Y-axis a range of salary and on its X-axis a number of people in percentile that fall within a certain salary amount. In this instance, the line graph 902 shows a median base salary 904 of $49,769, a 25 percentile base salary 906 of $43,075 and a 75 percentile base salary 908 of $65,394. Thus, half of the people that fall under this job title would earn between the base salary indicated at the 25 percentile and the 75 percentile. Included in the salary report page 900 is a written explanation 910 that explains the content of the graph and its significance. The salary report page 900 also provides a brief description 920 of the job title in terms of the level of education, years of experience, the type of jobs to be performed and so forth.

In accordance with one embodiment of the invention, the salary report page 900 provides one or more icons 932, 934, 936. When one of the icons 932, 934, 936 is clicked, it links the user to a selected job listings Website such as a job board, a company human resources department, a recruiter, a job-placement firm and so forth. For example, these Websites may be job-placement firms such as www.headhunter.net, www.hotjobs.com and www.monster.com as illistreted in FIG. 9.

According to one aspect of the invention, a mapping is created between the job title, location entry of the home page 500, job title page 600 and/or job search page 700 and the job listing Website. Each job title available in the server 150 is mapped with job listings that are available at the job listing Website. The job listings are further segregated geographically by zip code and state/metro area at the job listing Website. With the mapping in place, a user may be linked to the job listing Website directly to a listing of targeted jobs in the same field and same geography as the user's search criteria in the server 150. Thus, if the user has specified a job title and a zip code during a salary search in the server 150, a link to the job listing Website will display a list of jobs that meet the search criteria. Similarly, if the user has only specified a job title during a salary search, a link to the job listing Website will display a list of jobs that meet the job title on a nationwide basis. The mapping may also include a salary criteria. For example, the jobs available on the listing are selected for those paying more than the median base pay as shown in the salary report page 900 or jobs are listed that pays more than what the user currently earns or even 10% more than what the user currently earns.

Figure 9A:
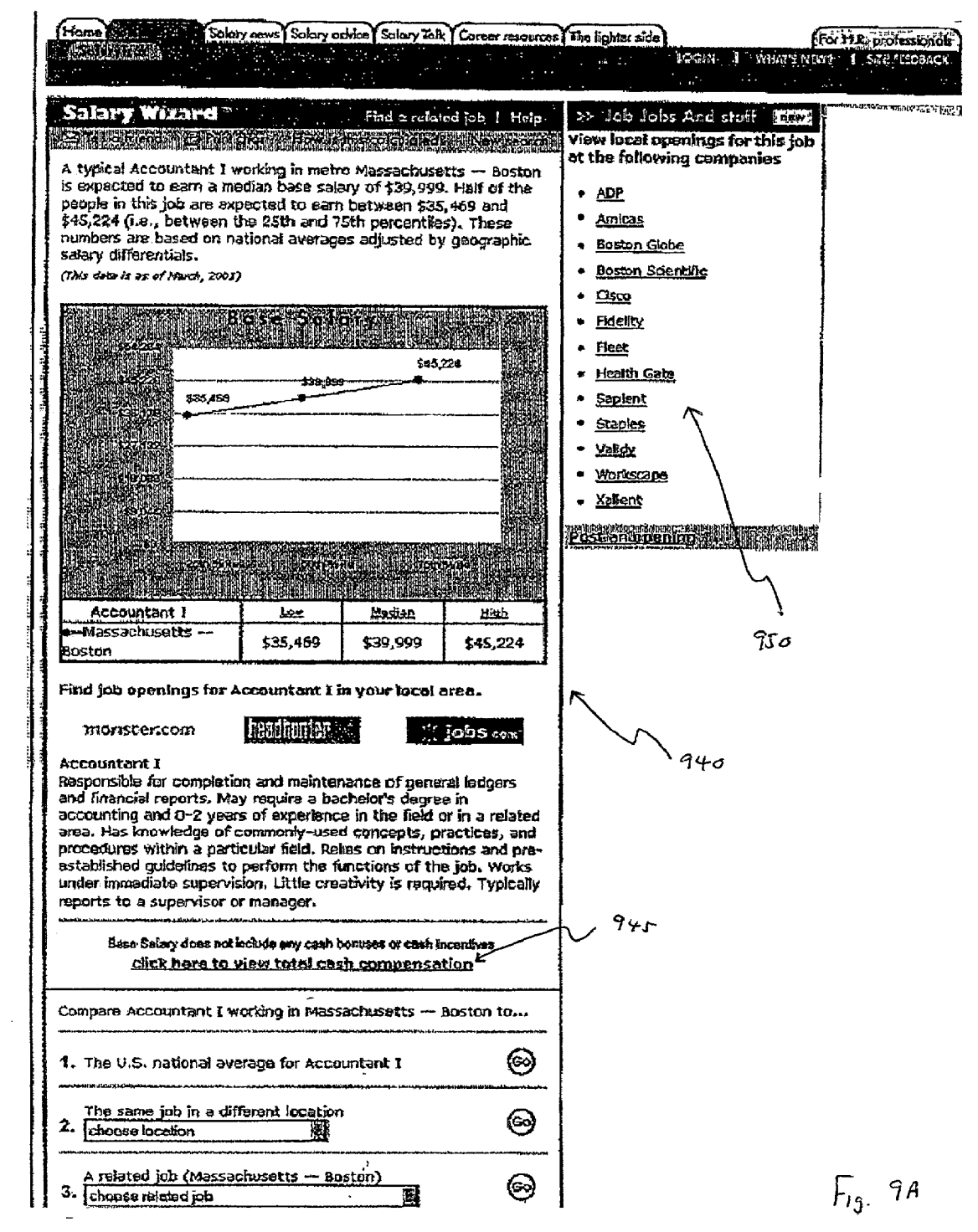

In accordance with one embodiment of the invention, the salary report page 940 provides one or more links to relevant job openings at specific companies as illustrated in FIG. 9A. For example, FIG. 9A shows that postings 950 for jobs similar to Accountant I are currently available in and around Boston, Mass. at ADP, Amicas, Boston Globe, Boston Scientific, Cisco, etc.

These postings 950 appear as a result of a mapping similar to those employed for mapping to job-placement Websites. Based on the job title and geography selected, matches may be conducted against national commercial job posting sites (e.g., CareerCast, RecruitUSA, etc.), local job posting sites (e.g., Boston.com, LATimes.com, WinterWyman.com), individual company posting sites (e.g., ADP, Amicas, Boston Scientific, etc.), or postings filed directly with server 300 for placement of specified compensation report pages. In one instance, those sites having matches are displayed on the salary report page 940 as postings 950.

Such postings may be displayed in a specific order or highlighted in any of a number of ways based on criteria associated with the specific listing. For example, which specific organizations are listed and their order could be determined based on an established priority scheme, or select postings could be featured with graphic enhancements.

Employers are also invited to "Post an opening" which is a way for employers utilizing the tool to immediately take advantage of the job posting feature. The employer is able to provide job-related information, company information and can also select on which exact job titles or job families and which specific geographic regions the posting will appear. The employer can also apply limits to the length of time or the number of referrals wanted for this listing.

Referring now to FIG. 10, a salary comparison page 1000, which may be an extension of the salary report page 900 provides for graphical comparisons of salaries that the user may make in conjunction with the salary graph associated with a job title. The salary comparison page 1000 includes additional icons 1002, 1004, 1006 that are associated with a U.S. national average for a job title, the same job title but in a different location, and a related job title.

Figure 11:
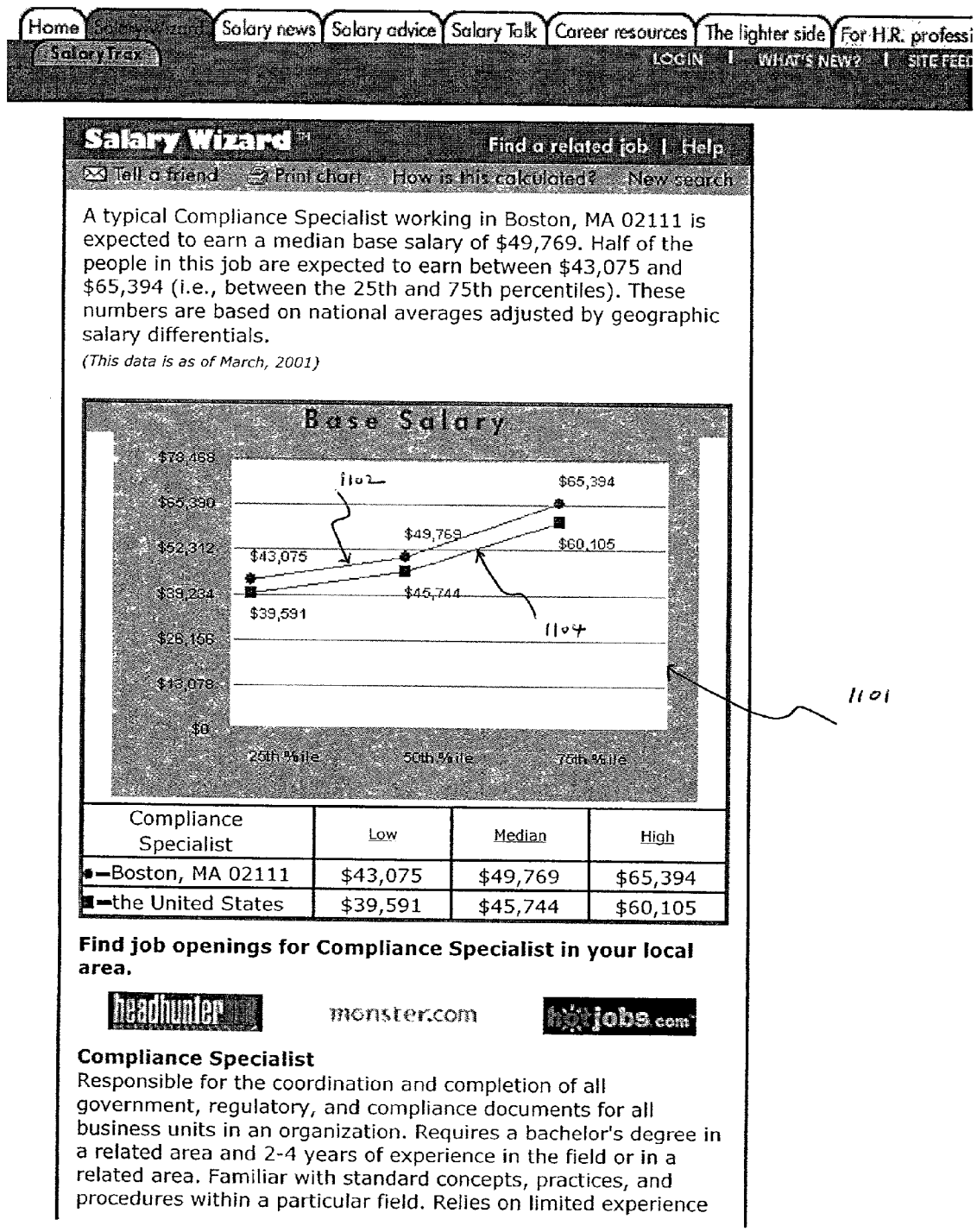
FIG. 11 illustrates a page with a comparison graph that shows a salary graph for a job title and a salary graph for United States average for the job title in accordance with an embodiment of the invention.
Figure 12:
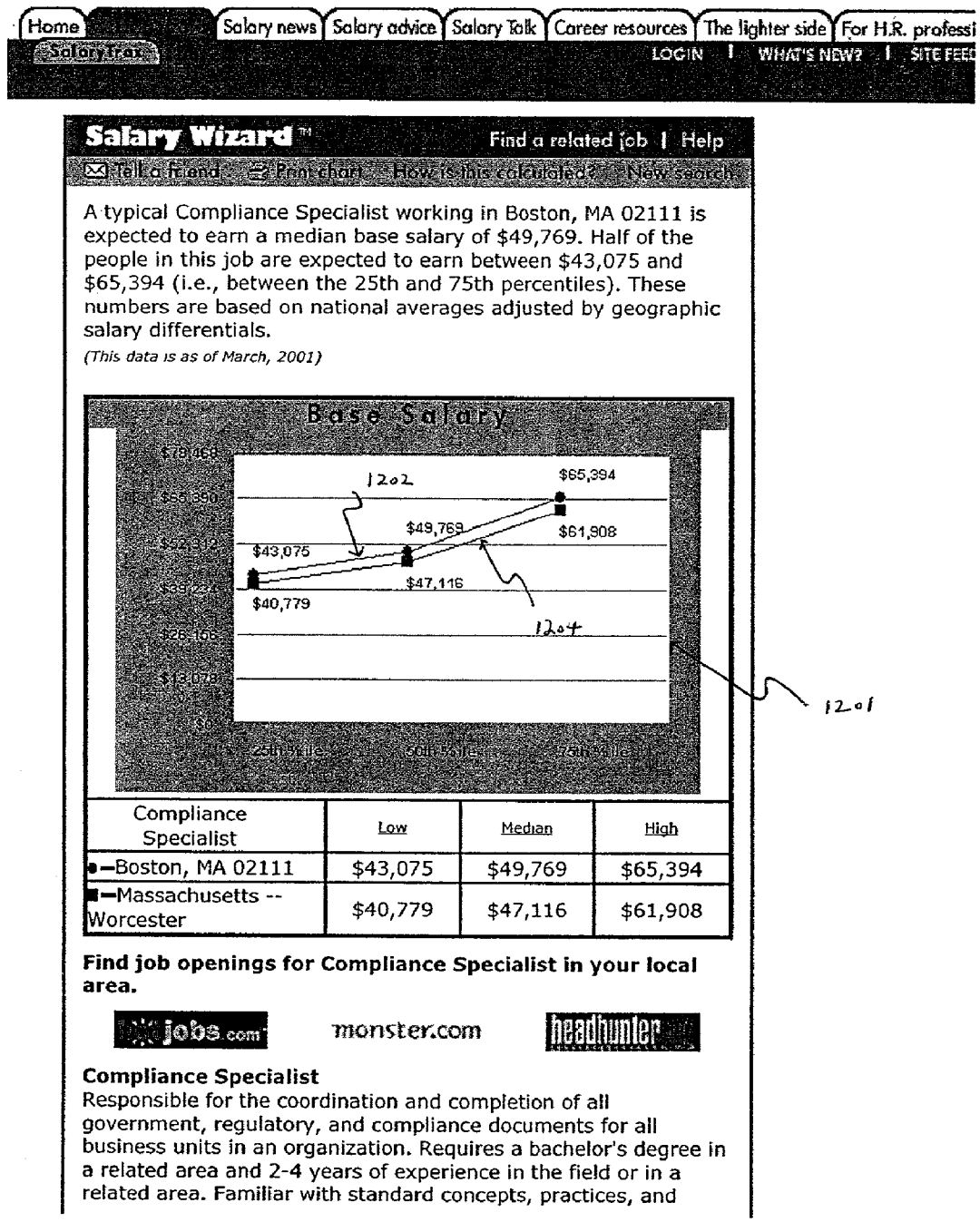
FIG. 12 illustrates a page with a comparison graph that shows a salary graph for a job title at a specified location and a salary graph for the job title at a different location.
Figure 13:
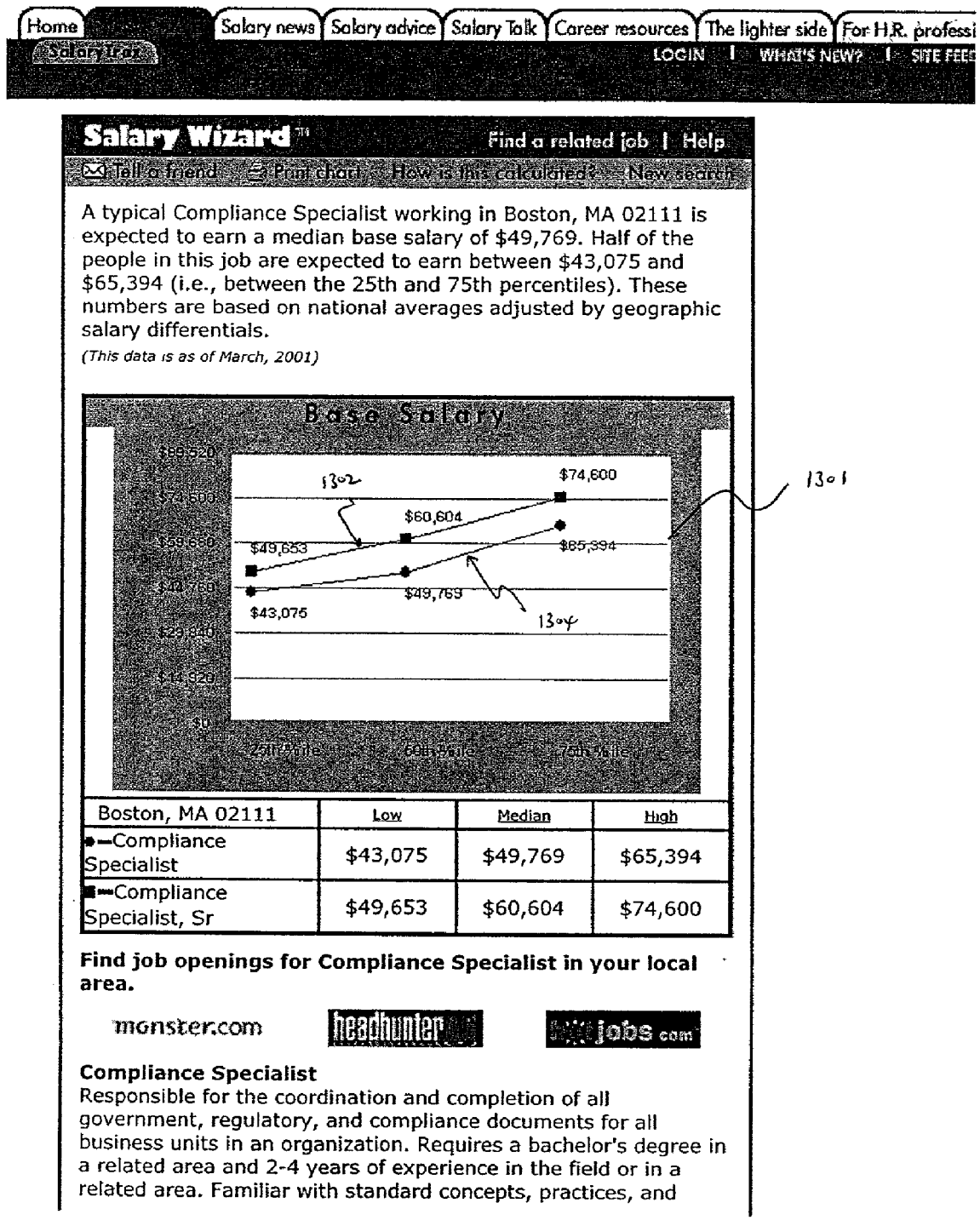
FIG. 13 illustrates a page with a comparison graph that shows a salary graph for a job title at a specified location and a salary graph for a related job title at the same location.

With reference to FIG. 4 in conjunction with FIGS. 11-13, the various features available with the salary comparison page 1000 will be now described. At stage 402, the user that desires to make a comparison search enters the salary comparison page 1000. At stage 404, the user decides which comparison the user would like to view. At stage 405, if the user desires to compare the job title at the selected location with the U.S. average, the user clicks the "Go" button 1002 corresponding to the U.S. average for the job title. At stages 406-409, the server 150 searches through the database 155 to retrieve salaries of the specified job title on a nationwide basis. With reference to FIG. 11, a comparison chart 1101 is produced that shows a salary graph 1102 for the job title and a salary graph 1104 for United States average for the job title. Similarly, At stage 415, if the user that desires to compare the job title at a selected location with the job title at a different location, the user chooses a location in the location entry 1003 and clicks the "Go" button 1004 corresponding to the same job title but in a different location. At stages 416-419, the server 150 searches the database 155 to retrieve salaries of the specified job title and at the location specified in the location entry 1003.

With reference to FIG. 12, a comparison chart 1201 is produced that shows a salary graph 1202 for the job title at the first selected location and a salary graph 1204 for the job title at the location specified in the location entry 1003. At stage 425, the user may desire to compare a selected job title with a different but related job title at the same location previously selected by the user. The user enters a related job title in an job title entry 1005 and clicks the "Go" button for a related job title. At stages 426-429, the server retrieves salary information based on the entered related job title and previously selected location. With reference to FIG. 13, a comparison chart 1301 is produced that shows a salary graph 1302 for the job title and a salary graph 1304 for the related job title at the selected location.

Figure 14:
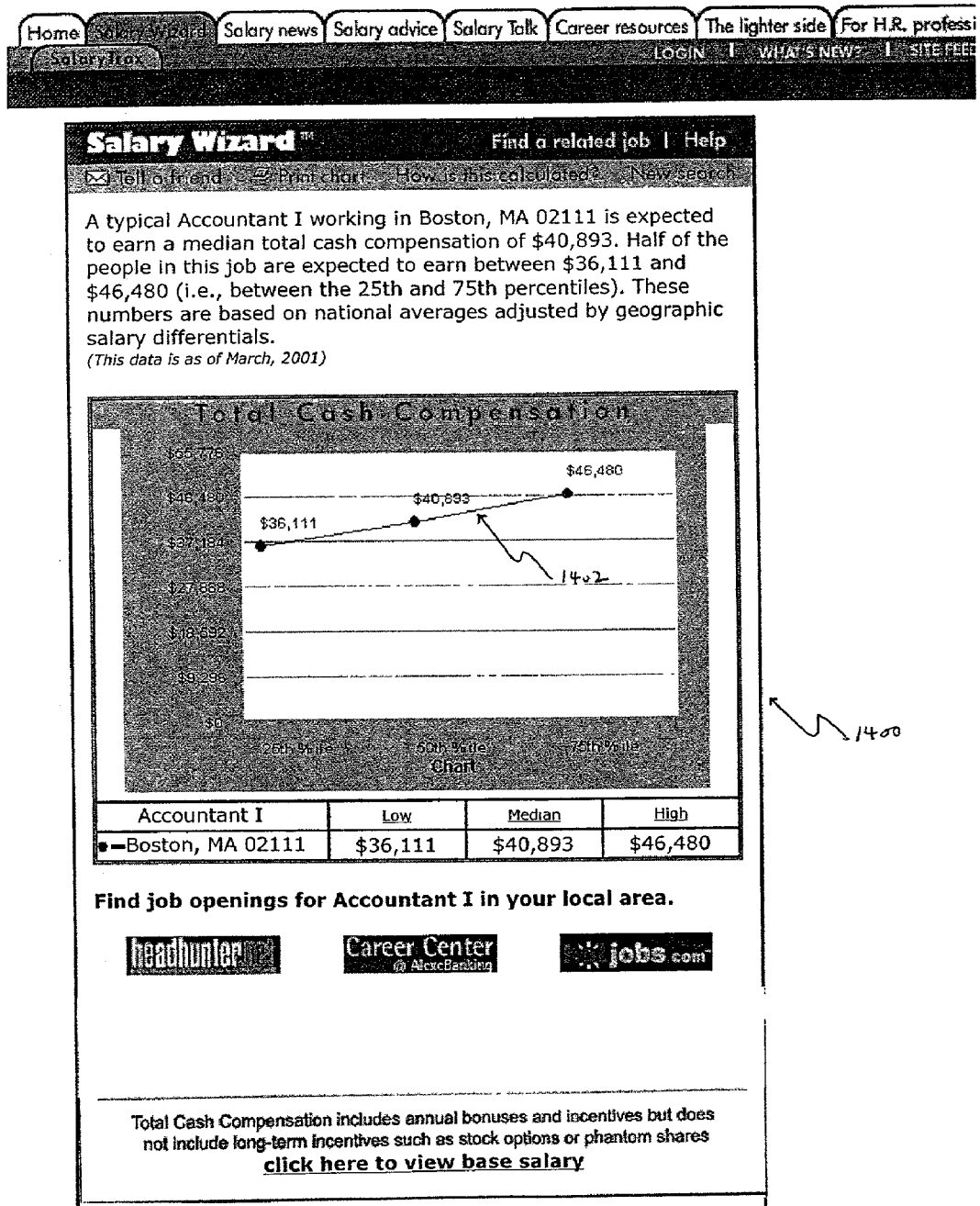
FIG. 14 illustrates a total cash compensation page in accordance with an embodiment of the invention.

Thus far, the salary information provided pertains to the base salary of the various job titles. The server 300 also provides a total cash compensation of the various job titles if requested by a user. The total cash compensation for a particular job title typically includes the base salary, the annual bonus and incentives. Referring to FIG. 9A, if the user desires to obtain total cash compensation for the job title Account I, for example, the user can click a link 945 titled "click here to view total cash compensation" to enter the total compensation report page. With reference to FIG. 14, a total compensation report page 1400 displays a total cash compensation information compiled by the server 300 in a form of a line graph 1402 for Account I.

In the embodiments described above, the home page may directly display all or a portion of a job title list rather than displaying a job category followed by displaying job titles related to job category. The processing unit can be a multiprocessing unit. The server need not be a single server but multiple servers connected by the Internet and dispersed at strategic geographic locations. Each server may contain identical or substantially identical database. Alternatively, each server may store salary information that is particular to the location and its vicinity of the server. If a server receives a request for salary information that is not in its database, the server requests and receives salary information from the server that has the salary information. A load balancer may be implemented such that the numerous salary information requests from multiple users may be evenly balanced among the multiple servers.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of providing compensation information over a communication network, the method comprising:
   prompting, over the communication network, a user to select an indication of a job from a plurality of job categories;
   receiving, over the communication network, a selection by the user of a job category;
   retrieving, from a database containing compensation information associated with jobs, desired compensation information corresponding to the selection by the user of the job category;
   transmitting the desired compensation information to the user over the communication network;
   prompting the user to select job comparison information to compare the desired compensation information associated with the selected job class and selected job titles with at least one of a national average compensation associated with the selected job class and job title, compensation for the selected job class and job title associated with a different geographic region than the selected geographic region, and compensation for the selected job class and the selected geographic region with a different job title associated with the selected job class;
   receiving, over the communication network, a selection by the user of comparison information;
   retrieving, from the database containing compensation information associated with jobs, desired comparison compensation information corresponding to the selection by the user of the comparison information;
   transmitting the desired comparison compensation information to the user over the communication network in addition to the desired compensation information in a format for comparing the desired compensation information and the desired comparison compensation information; and
   transmitting, over the communication network to the user, indicia of links to job opportunities, the links being selectable by the user to be connected via the communication network to information relating to at least one opportunity for a job corresponding to the selected job category.

2. The method of claim 1 wherein the prompting includes prompting the user to select a job class from a list of job classes and to select a job from a list of jobs within the selected job class.

3. The method of claim 1 wherein the prompting includes prompting for a geographic area of interest for the job.

4. The method of claim 3 wherein the geographic area is one of a postal code and a state/metropolitan area.

5. The method of claim 4 wherein the prompting includes prompting the user to select from a list of state/metropolitan areas.

6. The method of claim 1 further comprising providing a description of at least one job upon request by the user.

7. The method of claim 1 wherein the compensation information comprises salary information.

8. The method of claim 7 wherein the salary information comprises salary amounts of a plurality of percentiles of salaries associated with the job selected by the user.

9. The method of claim 1 wherein the desired compensation information is transmitted in a format adapted for graphical display by a user device.

10. A system for providing compensation information, the system comprising:

an interface module configured to provide prompts to a communication network for a user and to receive user-entered data from the network, the prompts including job data indicative of jobs, at least one prompt for the user to select at least a portion of the job data, and a prompt for selecting a geographic region, the user selected data including at least a selected portion of the job data indicative of at least one job, and a selected geographic region;

a compensation module coupled to the interface module and configured to acquire compensation information corresponding to the at least the selected portion of the job data and to provide the compensation information to the interface module;

wherein the prompts include at least one comparison prompt for the user to select other job data from at least one of a national average of compensation associated with a job from the selected portion of the job data, a job from at least a portion of the job data and a geographic location different than that of the selected portion of the job data, and a geographic location and a job class from at least a portion of the job data with a different job than that of the select portion of the job data;

wherein the interface module is further configured to provide the compensation information from the compensation module to the network for the user; and wherein the interface module is further configured to provide an opportunities link that is selectable by the user to connect the user via the communication network to information relating to at least one opportunity corresponding to the selected job data.

11. The system of claim 10 wherein the at least one prompt for the user to select include prompts for job classes and jobs within the job classes.

12. The system of claim 11 wherein the prompts for the job classes and the jobs within the job class are a list of selectable job class titles and lists of selectable job titles of jobs within the associated job classes, respectively.

13. The system of claim 11 wherein the at least a portion of the job data prompted for the user to select is at least one of a job class title and a job title of a job within a job class.

14. The system of claim 10 further comprising a database, coupled to the compensation module, that stores compensation information associated with at least one of job classes and job titles within the job classes, wherein the compensation module is configured to search the database and to retrieve the compensation information, corresponding to the job data for the at least one job, from the database in order to acquire the compensation information.

15. The system of claim 10 wherein the user-entered data is indicative of one of a zip code and a state/metropolitan area to indicate the selected geographic region.

16. The system of claim 15 wherein the prompts include a list of selectable state/metropolitan areas.

17. The system of claim 10 wherein the interface module is configured to provide descriptions related to jobs.

18. The system of claim 10 wherein the compensation information comprises salary information.

19. The system of claim 18 wherein the salary information includes salary amounts of a plurality of percentiles of salaries associated with the job data.

20. The system of claim 10 wherein the interface module and the compensation module comprise computer-readable instructions configured to be read by, and to control, a processor.

21. The system of claim 10 wherein the opportunities link includes job opportunities selectable by the user to connect the user via the communication network to information relating to at least one job opportunity corresponding to the selected job data.

22. The system of claim 10 wherein the opportunities link is provided to the interface module adjacent to the displayed job data.

23. A method of providing compensation information over a communication network, the method comprising:

receiving, over the communication network, an input by the user of a requested job category;

retrieving, from a database containing compensation information associated with job categories, requested compensation information corresponding to the requested job category input by the user;

transmitting the requested compensation information to the user over the communication network; and transmitting, over the communication network to the user, indicia of links to job opportunities corresponding to the requested job category, the links being selectable by the user to be connected via the communication network to information relating to at least one opportunity for a job corresponding to the requested job category.

24. A system for providing compensation information to a user over a communication network, the system comprising:

a computer processor including a server adapted to transmit and received data over a network, a database of job categories and associated compensation information and at least one data storage device for storing said database;

a first prompt prompting a user to input a job category, the server being adapted to transmit the first prompt over the communications network to the user;

the server being adapted to receive over the communication network from the user an indication of a requested job category;

the server being adapted to request from the database, compensation information corresponding to the requested job category from the user;

the server being adapted to transmit over the communication network to the user, the compensation information corresponding to the requested job category; and indicia of links to job opportunities corresponding to the requested job category, the links being selectable by the user to be connected via the communication network to information relating to at least one opportunity for a job corresponding to the requested job category.

* * * * *